(12) United States Patent
Schimke et al.

(10) Patent No.: US 11,543,115 B1
(45) Date of Patent: Jan. 3, 2023

(54) HEAT DISSIPATING LIGHT ASSEMBLY

(71) Applicant: Goodrich Corporation, Charlotte, NC (US)

(72) Inventors: Adam M. Schimke, Gilbert, AZ (US); Philippe Lapujade, Chandler, AZ (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 17/351,885

(22) Filed: Jun. 18, 2021

(51) Int. Cl.
| *F21V 29/77* | (2015.01) |
| *F21V 29/503* | (2015.01) |
| *F21V 29/83* | (2015.01) |
| *F21W 107/30* | (2018.01) |
| *F21Y 115/10* | (2016.01) |

(52) U.S. Cl.
CPC ............ *F21V 29/77* (2015.01); *F21V 29/503* (2015.01); *F21V 29/83* (2015.01); *F21W 2107/30* (2018.01); *F21Y 2115/10* (2016.08)

(58) Field of Classification Search
CPC ........ F21V 29/503; F21V 29/77; F21V 29/83; F21W 2107/30; F21Y 2115/10
See application file for complete search history.

(56) References Cited

U.S. PATENT DOCUMENTS

| 7,314,296 | B2 * | 1/2008 | Machi | .................... | B64D 47/06 |
| | | | | | 340/815.45 |
| 7,738,235 | B2 | 6/2010 | Gloisten et al. | | |
| 9,133,995 | B2 | 9/2015 | Quirion et al. | | |
| 9,206,971 | B2 | 12/2015 | Condon et al. | | |
| 9,869,464 | B2 | 1/2018 | Manahan | | |
| 10,773,826 | B1 * | 9/2020 | Lapujade | ................ | F21S 41/55 |
| 2010/0308731 | A1 | 12/2010 | Mo | | |
| 2019/0137089 | A1 * | 5/2019 | Grady | ..................... | F21V 29/74 |

FOREIGN PATENT DOCUMENTS

| DE | 202010002772 U1 * | 8/2010 | ............... B60Q 1/32 |
| DE | 202013003441 | 6/2013 | |
| EP | 2003058 A1 * | 12/2008 | ............. B64D 47/06 |
| EP | 3284683 A1 * | 2/2018 | ............. B64D 47/04 |
| EP | 3315847 | 5/2018 | |
| WO | 0071417 | 11/2000 | |
| WO | 2009156349 | 12/2009 | |

OTHER PUBLICATIONS

European Patent Office, European Search Report dated Oct. 20, 2022 in Application No. 22177782.4.

* cited by examiner

*Primary Examiner* — Britt D Hanley
(74) *Attorney, Agent, or Firm* — Snell & Wilmer L.L.P.

(57) ABSTRACT

A light assembly may comprise a heatsink, a plurality of light emitting diodes, and a lens. The heatsink may include a first surface and a second surface opposite the first surface. The second surface may define an airflow path extending from a first end of the heatsink to a second end of the heatsink. The plurality of light emitting diodes may be coupled to the first surface of the heatsink. The lens may be located over the plurality of light emitting diodes and may contact the heatsink.

20 Claims, 5 Drawing Sheets

HEAT DISSIPATING LIGHT ASSEMBLY

FIELD

The present disclosure relates to light assemblies and, in particular, to aircraft light assemblies.

BACKGROUND

Aircraft generally include exterior lights, such as anti-collision lights, landing taxi lights, or the like, which are located on an exterior of the aircraft to, for example, visually indicate the aircraft is in the vicinity. The exterior aircraft lights may employ light emitting diodes (LEDs). One of the design considerations for LEDs is heat dissipation, as overheating can lead to temporary malfunction and/or permanent damage to the LEDs.

SUMMARY

A light assembly is disclosed herein. In accordance with various embodiments, the light assembly may comprise a heatsink, a plurality of light emitting diodes, and a lens. The heatsink may include a first surface and a second surface opposite the first surface. The second surface may define an airflow path extending from a first end of the heatsink to a second end of the heatsink. The plurality of light emitting diodes may be coupled to the first surface of the heatsink. The lens may be located over the plurality of light emitting diodes and may contact the heatsink.

In various embodiments, a plurality of fins may extend from the second surface of the heatsink. In various embodiments, the light assembly may further comprise an aircraft mount including a base plate. The heatsink may be located over an upper surface of the base plate.

In various embodiments, a first fin of the plurality of fins may extend to the upper surface of the base plate. In various embodiments, a central support structure may be coupled between the plurality of fins and the upper surface of the base plate.

In various embodiments, the aircraft mount may further include a lens bezel coupled to the base plate. The lens may form a sealing interface with the lens bezel.

In various embodiments, the lens may include a first cutout proximate the first end of the heatsink and a second cutout proximate the second end of the heatsink. In various embodiments, the heatsink may include a first radially extending lip formed at the first end of the heatsink and a second radially extending lip formed at the second end of the heatsink. At least, a portion of the first radially extending lip and, at least, a portion of the second radially extending lip may be located exterior to the lens.

An aircraft light assembly is also disclosed herein. In accordance with various embodiments, the aircraft light assembly may comprise an aircraft mount, a light emitting diode assembly located over an upper surface of the aircraft mount, and a lens. The light emitting diode assembly may include a heatsink located on the upper surface of the aircraft mount. The heatsink may comprise a first surface, a second surface opposite the first surface, and a plurality of light emitting diodes coupled to the first surface. The second surface may define an airflow path extending from a first end of the heatsink to a second end of the heatsink. The lens may be located over the plurality of light emitting diodes. The lens may contact the heatsink.

In various embodiments, the light emitting diode assembly may further comprise a circuit board mounted on the first surface of the heatsink. The plurality of light emitting diodes may be electrically connected to the circuit board.

In various embodiments, the first surface of the heatsink may form a convex curve extending from the upper surface of the aircraft mount. In various embodiments, the second surface of the heatsink may form a concave curve extending from the upper surface of the aircraft mount.

In various embodiments, the heatsink may further comprise a plurality of fins extending inward from the second surface of the heatsink. In various embodiments, a first fin of the plurality of fins may extend to the upper surface of the aircraft mount.

In various embodiments, the lens may include a first cutout proximate the first end of the heatsink and a second cutout proximate the second end of the heatsink. In various embodiments, the heatsink may include a first lip formed at the first end of the heatsink and a second lip formed at the second end of the heatsink. In various embodiments, the lens may contact the first lip and the second lip.

A light emitting diode assembly for an aircraft light assembly is also disclosed herein. In accordance with various embodiments, the light emitting diode assembly may comprise a heatsink, including a first surface and a second surface opposite the first surface, and a plurality of light emitting diodes coupled to the first surface of the heatsink. The second surface of the heatsink may define an airflow path extending from a first end of the heatsink to a second end of the heatsink.

In various embodiments, the heatsink may further include a plurality of fins extending from the second surface. In various embodiments, the first surface of the heatsink may form a convex curve.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full, and/or any other possible attachment option.

Throughout the present disclosure, like reference numbers denote like elements. Accordingly, elements with like element numbering may be shown in the figures, but may not be necessarily repeated herein for the sake of clarity.

As used herein, "aft" refers to the direction associated with the tail (i.e., the back end) of an aircraft, or generally, to the direction of exhaust of a gas turbine engine. As used herein, "forward" refers to the direction associated with a nose (i.e., the front end) of an aircraft, or generally, to the direction of flight or motion.

Figure 1A:
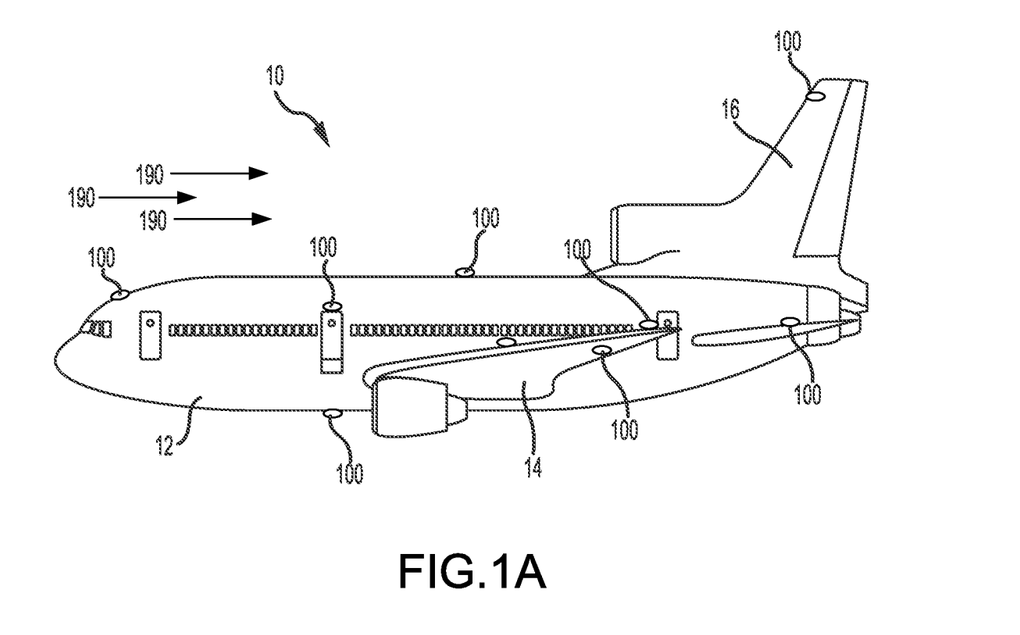
FIG. 1A illustrates an aircraft having light assemblies mounted to the exterior of the aircraft, in accordance with various embodiments.

With reference to FIG. 1A, an aircraft 10 having a fuselage 12, wings 14, and a tail 16 is illustrated. Aircraft 10 may be a fixed wing aircraft. In accordance with various embodiments, one or more aircraft light assemblies 100 may be mounted to the exterior of aircraft 10. For example, light assemblies 100 may be mounted to fuselage 12, wings 14 and/or tail 16. Light assemblies 100 may be employed as anti-collision lights, forward and/or tail positions lights (often referred to navigation lights), emergency exit lights, ground recognition beacons, landing and taxi lights, or any other exterior light of aircraft 10.

Figure 1B:
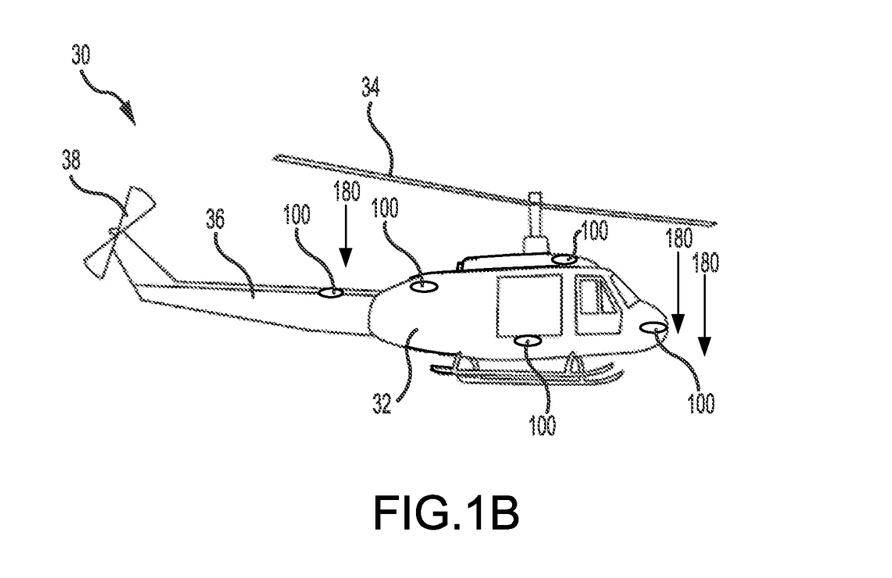
FIG. 1B illustrates a rotor aircraft having light assemblies mounted to the exterior of the rotorcraft, in accordance with various embodiments.

With reference to FIG. 1B, in various embodiments, light assemblies 100 may be coupled to an aircraft 30. Aircraft 30 may be a rotor aircraft (e.g., a helicopter). Aircraft 30 may include a fuselage 32, a main rotor 34, a tail 36, and a tail rotor 38. In accordance with various embodiments, one or more light assemblies 100 may be mounted to the exterior of aircraft 30. For example, light assemblies 100 may be mounted to fuselage 32 and/or tail 36. Light assemblies 100 may be employed as anti-collision lights, forward and/or tail positions lights, emergency exit lights, ground recognition beacons, landing and taxi lights, or any other exterior light of aircraft 30.

As described in further detail below, light assemblies 100 include LEDs attached to a thermally conductive base (or heatsink) and covered with a translucent shell (or lens). In accordance with various embodiments, the heatsink may include fins. Heat generated during operation of the LEDs is transferred via conduction to the fins. The fins are open to the external environment and dissipate the heat from the LEDs to the surrounding ambient air (e.g., via convection). Stated differently, light assemblies 100 are configured to cause heat, which is transferred from the LEDS to the heatsink, to be exchanged with external air flowing through the heatsink. As used herein "external air" refers to air outside of the aircraft (e.g., air flowing over the exterior surfaces of the aircraft). Light assemblies 100 thus reduce, or eliminate, the need to conduct heat to the airframe. The thermal management (e.g., heat dissipation) capabilities of light assemblies 100 allow light assemblies 100 to be employed in larger wattage applications (e.g., applications of 50 watts or greater) and/or in locations where natural convection and conductive thermal sinking to the aircraft is insufficient and/or where active cooling is not an option.

Figure 2A:
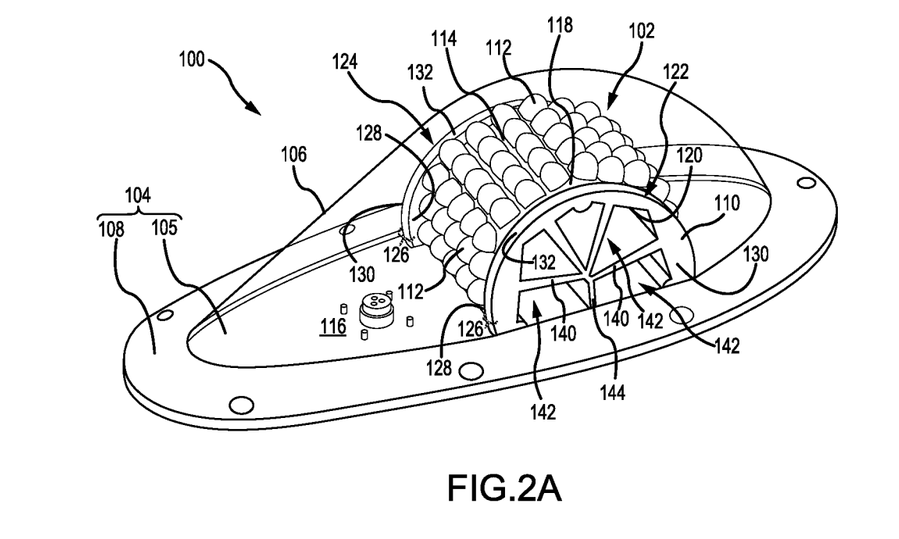
FIGS. 2A, 2B, and 2C illustrate a perspective view, an assembly view, and a side view, respectively, of an aircraft light assembly, in accordance with various embodiments.
Figure 2B:
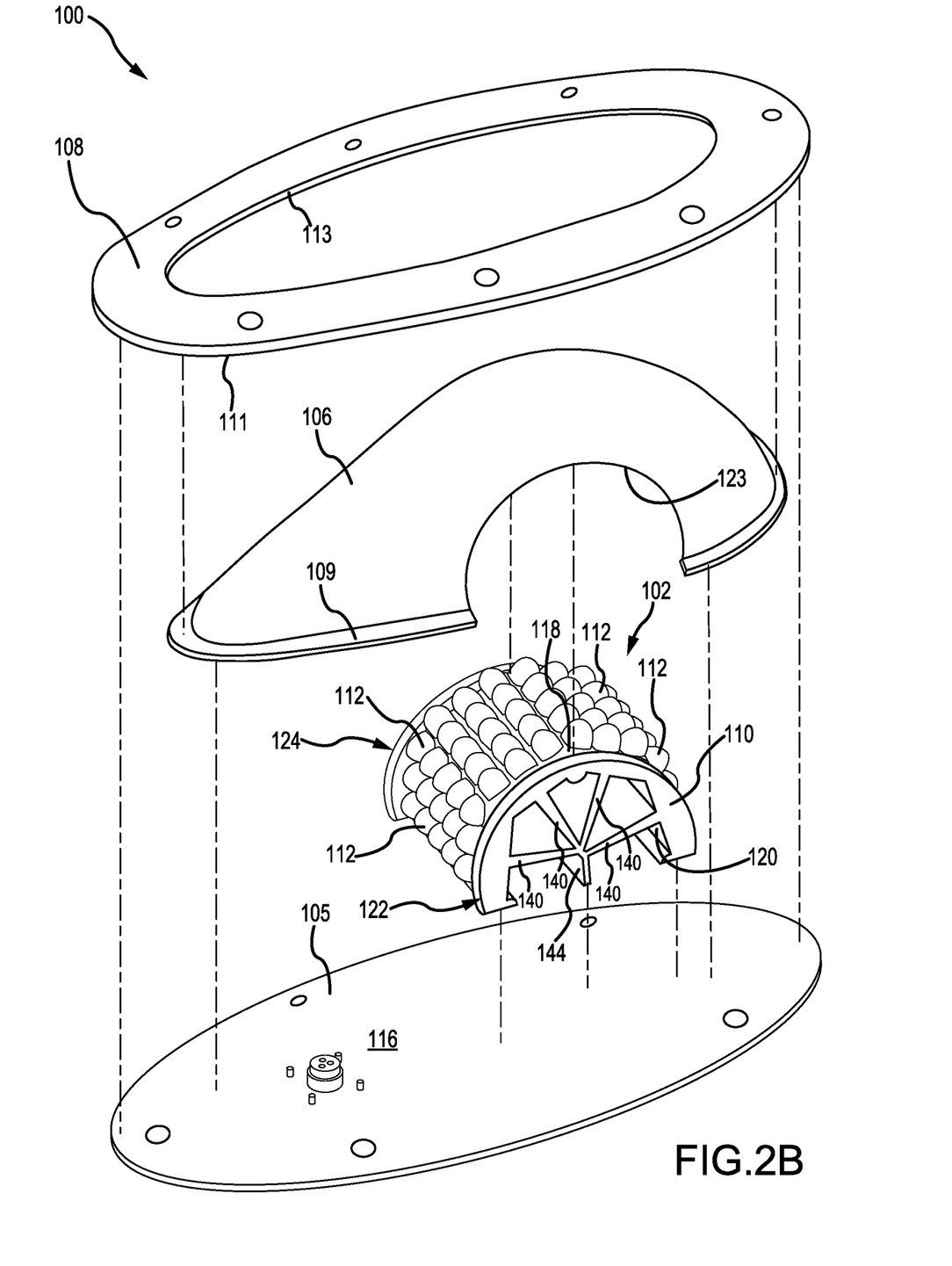
Figure 2C:
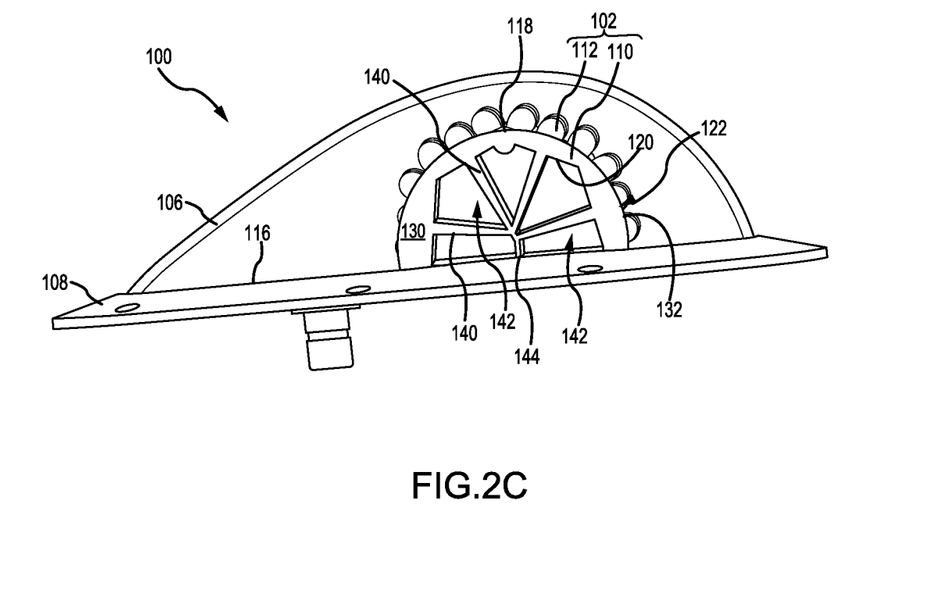

With reference to FIGS. 2A, 2B, and 2C an exemplary aircraft light assembly 100 is shown, in accordance with various embodiments. Light assembly 100 may comprise an LED assembly 102, an aircraft mount 104, and a lens 106. Aircraft mount 104 may include a base plate 105 and a lens bezel 108. LED assembly 102 may be coupled (e.g., mounted) to base plate 105. Base plate 105 may be coupled (e.g., mounted) to lens bezel 108. Base plate 105 may be attached to an underside (or first) surface 111 of lens bezel 108 via screws, nuts and bolts, clips, adhesive, and/or any other suitable securement means. LED assembly 102 and lens 106 are located over an upper (or first) surface 116 of base plate 105. Aircraft mount 104 is configured to be coupled to an exterior surface of aircraft 10 or aircraft 30 in FIGS. 1A and 1B, respectively. Stated different, light assembly 100 is coupled to aircraft 10 or aircraft 30 by attaching aircraft mount 104 to an exterior surface of an aircraft structure (e.g., to an exterior surface of fuselage 12, wings 14, tail 16, fuselage 32 or tail 36). Aircraft mount 104 (e.g., lens bezel 108 and/or base plate 105) may be attached to the aircraft structure via screws, nuts and bolts, clips, adhesive, and/or any other suitable securement means.

LED assembly 102 includes a heatsink (or base) 110 and a plurality of LEDs 112 coupled to heatsink 110. In various embodiments, LEDs 112 may be located on one or more LED circuit board(s) 114 mounted to heatsink 110. Heatsink 110 may be coupled to upper surface 116 of base plate 105 via welding, screws, nuts and bolts, clips, adhesive, and/or any other suitable securement means.

While base plate 105, lens bezel 108, and heatsink 110 are illustrated as separate, discrete structures, it is contemplated and understood that, in various embodiments, base plate 105, lens bezel 108, and/or heatsink 110 may be formed as a single, integral structure. For example, in various embodiments, heatsink 110 may be integral to base plate 105. In this regard, base plate 105 and heatsink 110 may be manufactured via milling, casting, molding, additive manufacturing, etc. as a single part, rather than manufacturing heatsink 110 and base plate 105 as separate parts and then attaching heatsink 110 to base plate 105. In various embodiments, base plate 105 may be integral to lens bezel (e.g., base plate 105 and lens bezel 108 may be manufactured via milling, casting, molding, additive manufacturing, etc. as a single part, rather than manufacturing lens bezel 108 and base plate 105 as separate parts and then attaching lens bezel 108 to base plate 105). In various embodiments, heatsink 110 may be integral to lens bezel (e.g., lens bezel 108 and heatsink 110 may be manufactured via milling, casting, molding, additive manufacturing, etc. as a single part, and base plate 105 may then be coupled to the single part). In various embodiments, heatsink 110 may be integral to base plate 105, and base plate 105 may be integral to lens bezel (e.g., heatsink 110, base plate 105, and lens bezel may be manufactured via milling, casting, molding, additive manufacturing, etc. as a single part).

Lens 106 is located over and covers LEDs 112 and LED circuit board(s) 114. Lens 106 extends to and/or contacts heatsink 110 and lens bezel 108. In various embodiments, a flange 109 of lens 106 may be located under lens bezel 108. For example, flange 109 may be located (e.g., sandwiched) between lens bezel 108 and upper surface 116 of base plate 105. In various embodiments, an inner circumferential surface 113 of lens bezel 108 may define a recess configured to receive flange 109 of lens 106. Lens 106 is configured to form a sealing interface with heatsink 110 and lens bezel 108. For example, in various embodiments, lens 106 may form a hermetic seal with lens bezel 108 and/or heatsink 110. Lens 106 protects the circuitry of circuit boards 114 and LEDs 112. Lens 106 may also be configured to distribute light emitted from LEDs 112.

In accordance with various embodiments, LEDs 112 are located over a first (or outer) surface 118 of heatsink 110. First surface 118 is opposite (i.e., oriented away from) a second (or inner) surface 120 of heatsink 110. In various embodiments, first surface 118 may comprise a curved shape. Stated differently, first surface 118 may form a convex (or c-shaped) surface extending from upper surface 116 of base plate 105. While first surface 118 is illustrated as having a generally semi-circular (or C-shaped) cross-section, it is contemplated and understood that first surface 118 may be oriented in other geometries. For example, first surface 118 may have multiple curvatures and/or portions oriented at a variety of angles relative to one another, depending on the desired configuration of LEDs 112.

First surface 118 and second surface 120 may each extend from a first end 122 of heatsink 110 to a second end 124 of heatsink 110. Second end 124 is axially opposite first end 122. In various embodiments, a radially extending lip, or flange, 126 may be formed at each of first end 122 and second end 124. Each Lip 126 may include a first radial surface 128 extending radially from first surface 118, a second radial surface 130 extending radially from second surface 120, and an outer circumferential surface 132 extending axially between first radial surface 128 and second radial surface 130. First radial surface 128 may be approximately parallel to second radial surface 130 and approximately normal to first surface 118. As used in the previous context only, "approximately parallel" means±10° from parallel and "approximately normal" means±10° from normal.

First surface 118 extends axially from the first radial surface 128 at first end 122 of heatsink 110 to the first radial surface 128 at second end 124 of heatsink 110. Second surface 120 extends axially from the second radial surface 130 at first end 122 of heatsink 110 to the second radial surface 130 at second end 124 of heatsink 110. A distance, or thickness, of heatsink 110 between second surface 120 and outer circumferential surface 132 is greater than the distance, or thickness, of heatsink 110 between second surface 120 and first surface 118. In various embodiments, inner circumferential surface 113 of lens bezel 108 may extend to and/or contact second radial surface 130 at first end 122 of heatsink 110. Inner circumferential surface 113 may also extend to and/or contact second radial surface 130 at second end 124 of heatsink 110.

In various embodiments, lens 106 extends to and/or contacts the outer circumferential surface 132 of lips 126. In various embodiments, lens 106 extends to and/or contacts first surface 118 of heatsink 110, such that lips 126 are outside, or exterior to, lens 106. In various embodiments, lens 106 may also contact first radial surface 128. In various embodiments, first radial surface 128 may define a recess configured to receive a flange of lens 106. Lips 126 (e.g., first radial surfaces 128) tend to provide an increased surface area for generating a sealing interface between heatsink 110 and lens 106. Lips 126 may also be configured to block light emitted from one or more LEDs 112 in one or more desired directions.

Lens 106 includes a first cutout 123 (or contoured surface) at first end 122 of heatsink 110 and a second cutout (or contoured surface), similar to first cutout 123, at second end 124 of heatsink 110. In various embodiments, the shape of the first and second cutouts mirrors, or complements, the shape of first surface 118 of heatsink 110. The first and second cutouts are configured to allow lens 106 to contact and/or form a sealing interface with heatsink 110, while allowing fluid (e.g., air) exterior to lens 106 to flow through heatsink 110 (e.g., to flow from first end 122 to second end 124 along second surface 120).

In accordance with various embodiments, second surface 120 defines an airflow path under LEDs 112. The configuration of heatsink 110 and lens 106 allows fluid (e.g., ambient air) that is exterior to lens 106 to flow across second surface 120 of heatsink 110 (e.g., from first end 122 to second end 124), thereby dissipating heat from heatsink 110 via convection, while LEDs 112 and circuit boards 114 remain protected and/or sealed off from the fluid by lens 106. Heatsink 110 is formed of material having sufficient thermal conductivity (e.g., a metal or metal alloy such as steel, stainless steel, aluminum, copper, etc.) to allow heat to easily transfer from LEDs 112 and circuit boards 114 to heatsink 110.

In accordance with various embodiments, heatsink 110 includes one or more fin(s) 140 extending from second surface 120. Fins 140 and second surface 120 define a plurality of fluid channels 142 extending from first end 122 to second end 124. Fluid channels 142 fluidly connect the exterior area of lens 106 proximate first end 122 and the exterior area of lens 106 proximate second end 124. Fins 140 may extend axially from first end 122 to second end 124 of heatsink 110. Fins 140 increase the surface area of heatsink 110 that is exposed to the air flowing between first end 122 and second end 124, thereby increasing the surface area for heat transfer to the air. In various embodiments, fins 140 may be connected to a central support structure 144. Central support structure 144 may extend to and/or contact upper surface 116 of base plate 105. In various embodiments, central support structure 144 may be eliminated from heatsink 110, and fins 140 may terminate prior to contact with one other. The number of fins 140 and the arrangement of fins 140 along second surface 120 in FIGS. 2A, 2B, 2C, is an example fin arrangement, it is contemplated and understood that any number of fins and/or fins in other arrangements may be employed. In accordance with various embodiments, the thickness each fin 140, the length each fin 140 (as measured from second surface 120), and the location on second surface 120 of each fin 140 are selected such that an equal, or almost equal, amount of thermal energy passes through each fin 140 for even exposure in the fluid channels 142.

The configuration of heatsink 110 and lens 106 creates an environmental air flow path through light assembly 100 that allows heat generated by LEDs 112 to be exchanged with cooler free-flowing air (or forced air exhibited during flight), thereby decreasing, or eliminating, the need to conduct the heat to the airframe, while still protecting LEDs 112 and circuit boards 114 from exposure to elements (e.g., dust, debris, water, etc.) outside lens 106.

With combined reference to FIGS. 1B and 2A, in various embodiment, one or more of aircraft light assemblies 100 may be mounted to aircraft 30 such that the airflow 180 generated by main rotor 34 is forced through fluid channels 142. For example, aircraft light assemblies 100 may be oriented such that the flow direction through fluid channels 142 is parallel to the direction of airflow 180 from main rotor 34. In this regard, aircraft mount 104 may be mounted to fuselage 32 or tail 36 such that the second radial surface 130 of either first end 122 or second end 124 of heatsink 110 is oriented toward the main rotor 34. Stated differently, second surface 120 of heatsink 110 may be approximately parallel to the axis of rotation of main rotor 34, and second radial surface 130 may be approximately perpendicular to the axis of rotation of main rotor 34. As used in the previous context only, "approximately parallel" means±10° from parallel and "approximately perpendicular" means±10° from perpendicular. Flowing the airflow 180 generated by main rotor 34 through fluid channels 142 tends to increase the thermal efficiency of aircraft light assemblies 100.

With combined reference to FIGS. 1A and 2A, in various embodiments, one or more of aircraft light assemblies 100 may be mounted to aircraft 10 such that an airflow 190 generated during flight of aircraft 10 is forced through fluid channels 142. For example, aircraft light assemblies 100 may be oriented such that the flow direction through fluid channels 142 is parallel to the direction of airflow 190 (e.g., parallel to the direction of flight). In this regard, aircraft mount 104 may be mounted to fuselage 12, wings 14, or tail 16 such that the second radial surface 130 of either first end 122 or second end 124 of heatsink 110 is oriented in the forward direction. Stated differently, second surface 120 of heatsink 110 may be approximately parallel to an axis extending in the forward-to-aft direction, and second radial surface 130 may be approximately perpendicular to an axis extending in the forward-to-aft direction. As used in the previous context only, "approximately parallel" means±10° from parallel and "approximately perpendicular" means±10° from perpendicular. Flowing the airflow 190 generated during flight through fluid channels 142 tends to increase the thermal efficiency of aircraft light assemblies 100.

Figure 3:
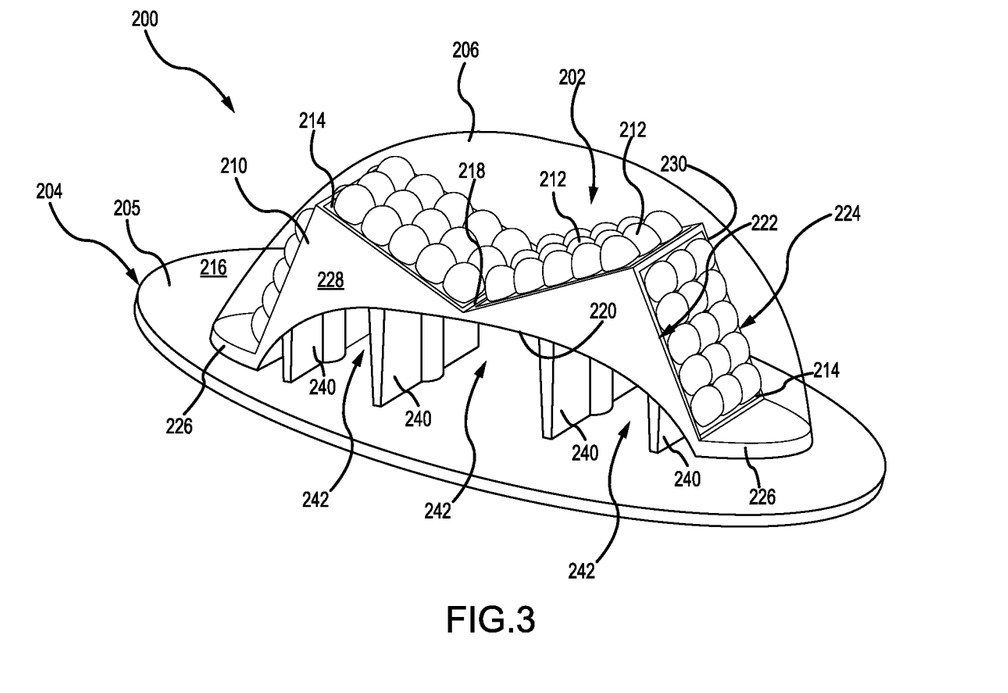
FIG. 3 illustrates an aircraft light assembly, in accordance with various embodiments.

With reference to FIG. 3, an aircraft light assembly 200 is shown. Aircraft 10 in FIG. 1A and/or aircraft 30 in FIG. 1B may include light assembly 200 in place of one or more of the light assemblies 100. Light assembly 200 may comprise an LED assembly 202, an aircraft mount 204, and a lens 206. Aircraft mount 204 includes a base plate 205. In various embodiments, aircraft mount 204 may also include a lens bezel, similar to lens bezel 108 of aircraft mount 104 in FIGS. 2A and 2B, and lens 206 may form a sealing interface with the lens bezel, similar to lens 106 in FIGS. 2A and 2B.

LED assembly 202 and lens 206 are located over an upper (or first) surface 216 of base plate 205. Aircraft mount 204 is configured to be coupled to an exterior surface of aircraft 10 or aircraft 30 in FIGS. 1A and 1B, respectively. Stated different, light assembly 200 is coupled to aircraft 10 or aircraft 30 by attaching aircraft mount 204 to an exterior surface of an aircraft structure (e.g., to an exterior surface of fuselage 12, wings 14, tail 16, fuselage 32 or tail 36). Aircraft mount 204 (e.g., base plate 205) may be attached to the aircraft structure via screws, nuts and bolts, clips, adhesive, and/or any other suitable securement means.

LED assembly 202 includes a heatsink (or base) 210 and a plurality of LEDs 212 coupled to heatsink 210. In various embodiments, LEDs 212 may be located on one or more LED circuit board(s) 214, which are mounted to heatsink 210. Heatsink 210 may be coupled to upper surface 216 of base plate 205 via welding, screws, nuts and bolts, clips, adhesive, and/or any other suitable securement means.

While base plate 205 and heatsink 210 are illustrated as separate, discrete structures, it is contemplated and understood that, in various embodiments, base plate 205 and heatsink 210 may be formed as a single, integral structure. For example, in various embodiments, heatsink 210 may be integral to base plate 205. In this regard, base plate 205 and heatsink 210 may be manufactured via milling, casting, molding, additive manufacturing, etc. as a single part, rather than manufacturing heatsink 210 and base plate 205 as separate parts and then attaching heatsink 210 to base plate 205.

Lens 206 may be located over LEDs 212 and LED circuit board(s) 214. Lens 206 extends to and/or contacts heatsink 210. In various embodiments, lens 206 extends to and contacts upper surface 216 of base plate 205. Lens 206 is located over and covers LEDs 212 and LED circuit board(s) 214. In this regard, lens 206 may protect the circuitry of circuit boards 214 and LEDs 212 from elements external to lens 206. Lens 206 may also be configured to distribute light emitted from LEDs 212.

In accordance with various embodiments, LEDs 212 are located over a first (or outer) surface 218 of heatsink 210. First surface 218 is opposite (i.e., oriented away from) a second (or inner) surface 220 of heatsink 210. In various embodiments, first surface 218 may comprise a plurality of planar (e.g., flat) sections oriented at varying angles. In various embodiments, second surface 220 may be oriented in a curve. For example, second surface 220 may form a concave (or C-shaped) surface extending from upper surface 216 of base plate 205.

First surface 218 and second surface 220 may each extend from a first end 222 of heatsink 210 to a second end 224 of heatsink 210. Second end 224 is axially opposite first end 222. In various embodiments, a first radial surface 228 at first end 222 of heatsink 210 may extend radially between first surface 218 and second surface 220. A second radial surface 230 at second end 224 of heatsink 210 may extend radially between first surface 218 and second surface 220. In various embodiments, heatsink 210 may include one or more attachment flanges 226. Attachment flanges 226 may be used to secure heatsink 210 to base plate 205.

First radial surface 228 may be approximately parallel to second radial surface 230 and approximately normal to first surface 218 and second surface 220. As used in the previous context only, "approximately parallel" means±10° from parallel and "approximately normal" means±10° from normal. Each of first surface 218 and second surface 220 extends axially from the first radial surface 228 at first end 222 to the second radial surface 230 at second end 224.

Lens 206 includes a first cutout (or contoured surface) at first end 222 of heatsink 210 and a second cutout (or contoured surface) at second end 224 of heatsink 210. The perimeter of lens 206, including the first and second cutouts, is configured to allow lens 206 to contact and/or form a sealing interface with heatsink 210, while allowing fluid exterior to lens 206 to flow through heatsink 210 (i.e., along second surface 220 and from first end 222 to second end 224). In various embodiments, lens 206 may extend to and/or contact first radial surface 228 and second radial surface 230 such that first radial surface 228 and second radial surface 230 are inside (or interior to) lens 206, and the first and second cutouts in lens 206 may have a shape that mirrors (or complements) the shape of second surface 220 of heatsink 210. In various embodiments, lens 206 may extend to and/or contact first surface 218 such that first radial surface 228 and second radial surface 230 are outside (or exterior to) lens 206, and the first and second cutouts in lens 206 have a shape that mirrors (or complements) the shape of first surface 218 of heatsink 210. In various embodiments, lens 206 may also contact and form a sealing interface with base plate 205.

In accordance with various embodiments, second surface 220 defines an airflow path under LEDs 212. The configuration of heatsink 210 and lens 206 allows fluid (e.g., ambient air) that is exterior to lens 206 to flow across second surface 220 of heatsink 210 (e.g., from first end 222 to second end 224), thereby dissipating heat from heatsink 210 via convection, while LEDs 212 and circuit boards 214 remain protected and/or sealed off from the fluid by lens 206. Heatsink 210 is formed of material having good thermal conductivity (e.g., a metal or metal alloy) to allow heat to easily transfer from LEDs 212 and circuit boards 214 to heatsink 210.

In accordance with various embodiments, heatsink 210 includes one or more fin(s) 240 extending from second surface 220. Fins 240 and second surface 220 define a plurality of fluid channels 242 extending from first end 222 to second end 224. Fluid channels 242 fluidly connect the exterior area of lens 206 proximate first end 222 of heatsink 210 and the exterior area of lens 206 proximate second end 224 of heatsink 210. Fins 240 may axially extend from first end 222 to second end 224 of heatsink 210. In various embodiments, fins 240 extend to and/or contact upper surface 216 of base plate 205. In various embodiments, one or more fin(s) 240 may terminate prior to upper surface 216, such that fluid may flow between the bottom end of fin 240 (i.e., the end opposite second surface 220) and upper surface 216. Fins 240 increase the surface area of heatsink 210 that is exposed to the air flowing between first end 222 and second end 224, thereby increasing the surface area for heat transfer to the air. In accordance with various embodiments, the thickness each fin 240, the length each fin 240 (as measured from second surface 220), and the location on second surface 220 of each fin 240 may be selected such that an equal, or almost equal, amount of thermal energy passes through each fin 240 for even exposure in the fluid channels 242. The configuration of heatsink 210 and lens 206 creates an environmental air flow path through light assembly 200 that allows heat generated by LEDs 212 to be exchanged with cooler free-flowing air (or forced air exhibited during flight), thereby decreasing, or eliminating, the need to conduct the heat to the airframe, while still protecting LEDs 212 and circuit boards 214 from environmental damage.

With combined reference to FIG. 1B and FIG. 3, in various embodiment, one or more of aircraft light assemblies 200 may be mounted to aircraft 30 such that the airflow 180 generated by main rotor 34 is forced through fluid channels 242. For example, aircraft light assemblies 200 may be oriented such that the flow direction through fluid channels 242 is parallel to the direction of airflow 180 from main rotor 34. In this regard, aircraft mount 204 may be mounted to fuselage 32 or tail 36 such that either first radial surface 228 or second radial surface 230 is oriented toward the main rotor 34. Stated differently, second surface 220 of heatsink 210 may be approximately parallel to the axis of rotation of main rotor 34, and first and second radial surfaces 228, 230 may be approximately perpendicular to the axis of rotation of main rotor 34. As used in the previous context only, "approximately parallel" means±10° from parallel and "approximately perpendicular" means±10° from perpendicular. Flowing the airflow 180 generated by main rotor 34 through fluid channels 242 tends to increase the thermal efficiency of aircraft light assemblies 200.

With combined reference to FIG. 1A and FIG. 3, in various embodiments, one or more of aircraft light assemblies 200 may be mounted to aircraft 10 such that the airflow 190 generated during flight of aircraft 10 is forced through fluid channels 242. For example, aircraft light assemblies 200 may be oriented such that the flow direction through fluid channels 242 is parallel to the direction of airflow 190 (e.g., parallel to the direction of flight). In this regard, aircraft mount 204 may be mounted to fuselage 12, wings 14, or tail 16 such that either first radial surface 228 or second radial surface 230 is oriented in the forward direction. Stated differently, second surface 220 of heatsink 210 may be approximately parallel to an axis extending in the forward-to-aft direction, and first and second radial surfaces 228, 230 may be approximately perpendicular to an axis extending in the forward-to-aft direction. As used in the previous context only, "approximately parallel" means±10° from parallel and "approximately perpendicular" means±10° from perpendicular. Flowing the airflow 190 generated during flight through fluid channels 242 tends to increase the thermal efficiency of aircraft light assemblies 200.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not

What is claimed is:

1. A light assembly, comprising:
a heatsink including a first surface and a second surface opposite the first surface, the second surface defining an airflow path extending from a first end of the heatsink to a second end of the heatsink;
a plurality of light emitting diodes coupled to the first surface of the heatsink; and
a lens located over the plurality of light emitting diodes and contacting to the heatsink,
wherein the lens includes a first cutout proximate the first end of the heatsink and a second cutout proximate the second end of the heatsink.

2. The light assembly of claim 1, further comprising a plurality of fins extending from the second surface of the heatsink.

3. The light assembly of claim 2, further comprising an aircraft mount including a base plate, wherein the heatsink is located over an upper surface of the base plate.

4. The light assembly of claim 3, wherein a first fin of the plurality of fins extends to the upper surface of the base plate.

5. The light assembly of claim 3, further comprising a central support structure coupled between the plurality of fins and the upper surface of the base plate.

6. The light assembly of claim 3, wherein the aircraft mount further includes a lens bezel coupled to the base plate, and wherein the lens forms a sealing interface with the lens bezel.

7. The light assembly of claim 1, wherein the heatsink includes a first lip formed at the first end of the heatsink and a second lip formed at the second end of the heatsink, and wherein, at least, a portion of the first lip and, at least, a portion of the second lip are located exterior to the lens.

8. An aircraft light assembly, comprising:
an aircraft mount;
a light emitting diode assembly located over an upper surface of the aircraft mount, the light emitting diode assembly including:
a heatsink located on the upper surface of the aircraft mount, the heatsink comprising a first surface and a second surface opposite the first surface, wherein the second surface defines an airflow path extending from a first end of the heatsink to a second end of the heatsink; and
a plurality of light emitting diodes coupled to the first surface of the heatsink; and
a lens located over the plurality of light emitting diodes, wherein the lens contacts the heatsink,
wherein the lens includes a first cutout proximate the first end of the heatsink and a second cutout proximate the second end of the heatsink.

9. The aircraft light assembly of claim 8, wherein the light emitting diode assembly further comprises a circuit board mounted on the first surface of the heatsink, wherein the plurality of light emitting diodes are electrically connected to the circuit board.

10. The aircraft light assembly of claim 8, wherein the first surface of the heatsink forms a convex curve extending from the upper surface of the aircraft mount.

11. The aircraft light assembly of claim 8, wherein the second surface of the heatsink forms a concave curve extending from the upper surface of the aircraft mount.

12. The aircraft light assembly of claim 8, wherein the heatsink further comprises a plurality of fins extending inward from the second surface of the heatsink.

13. The aircraft light assembly of claim 12, wherein a first fin of the plurality of fins extends to the upper surface of the aircraft mount.

14. The aircraft light assembly of claim 13, wherein the heatsink includes a first lip formed at the first end of the heatsink and a second lip formed at the second end of the heatsink.

15. The aircraft light assembly of claim 14, wherein the lens contacts the first lip and the second lip.

16. A light emitting diode assembly for an aircraft light assembly, the light emitting diode assembly comprising:
a heatsink including a first surface and a second surface opposite the first surface, wherein the second surface defines an airflow path extending from a first end of the heatsink to a second end of the heatsink; and
a plurality of light emitting diodes coupled to the first surface of the heatsink,
a lens located over the plurality of light emitting diodes, wherein the lens contacts the heatsink, and
wherein the lens includes a first cutout proximate the first end of the heatsink and a second cutout proximate the second end of the heatsink.

17. The light emitting diode assembly of claim 16, wherein the heatsink further includes a plurality of fins extending from the second surface.

18. The light emitting diode assembly of claim 17, wherein the first surface of the heatsink forms a convex curve.

19. The light emitting diode assembly of claim 16,
wherein the heatsink includes a first lip formed at the first end of the heatsink and a second lip formed at the second end of the heatsink, and
wherein, at least, a portion of the first lip and, at least, a portion of the second lip are located exterior to the lens.

20. The light emitting diode assembly of claim 16,
wherein the heatsink includes a first lip formed at the first end of the heatsink and a second lip formed at the second end of the heatsink, and
wherein the lens contacts the first lip and the second lip.

* * * * *